Oct. 16, 1951     G. SWINNERTON     2,571,783
SHUTTER MECHANISM FOR CAMERAS
Filed Aug. 11, 1949     2 SHEETS—SHEET 1
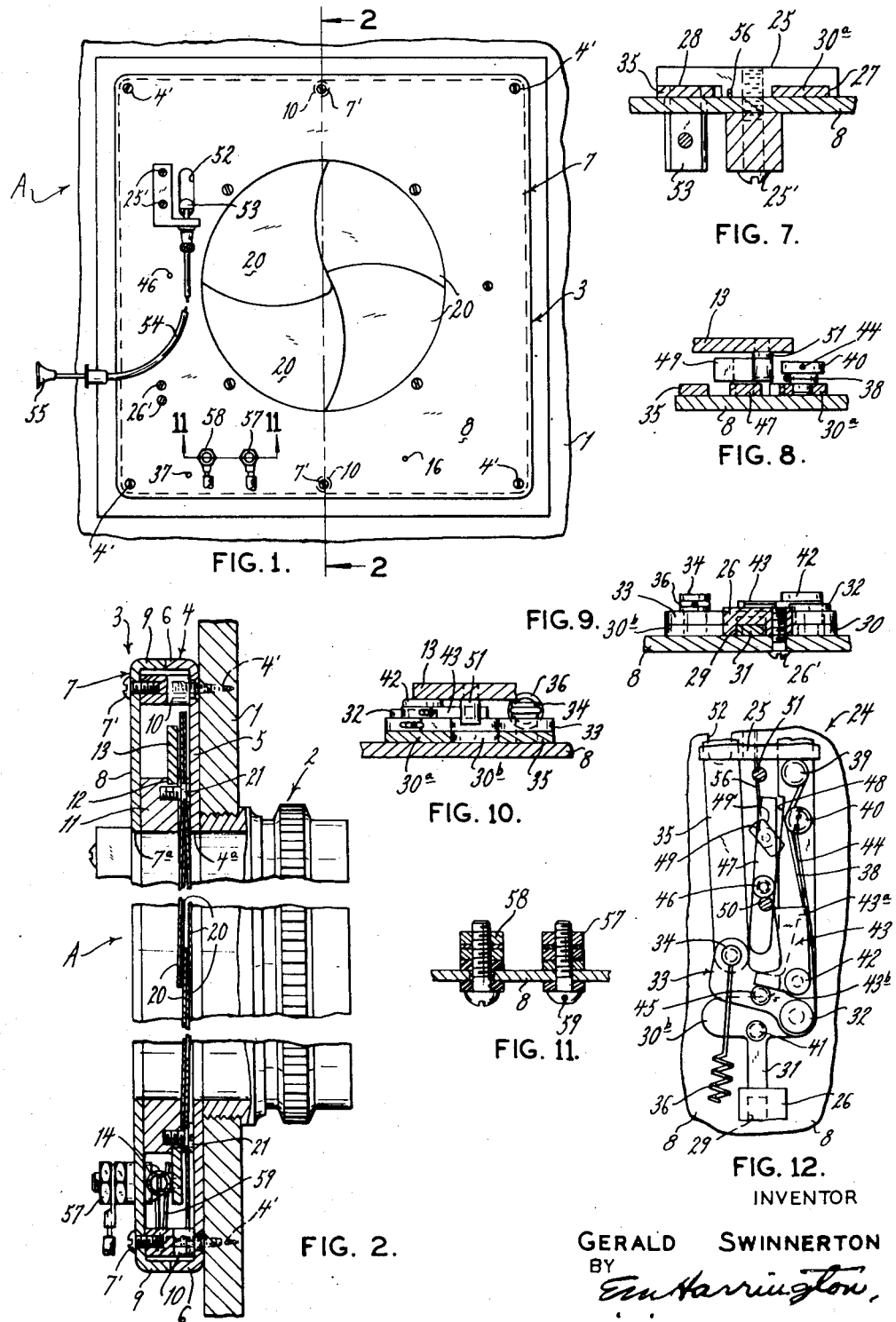
INVENTOR
GERALD SWINNERTON
BY
ATTORNEY INVENTOR
GERALD SWINNERTON
BY
Tim Harrington
ATTORNEY Patented Oct. 16, 1951

2,571,783

UNITED STATES PATENT OFFICE 2,571,783

SHUTTER MECHANISM FOR CAMERAS

Gerald Swinnerton, St. Louis, Mo., assignor, by mesne assignments, to National Camera Works, St. Louis, Mo., a copartnership Application August 11, 1949, Serial No. 109,679

10 Claims. (Cl. 95—63)

1

This invention relates generally to shutters for cameras and more specifically to mechanisms for actuating the blades of shutters of cameras of the studio type, the predominant object of the invention being to provide a shutter structure for a camera of the studio type which is provided with blade-actuating mechanism of such improved construction and arrangement that the efficiency of the shutter structure is very greatly enhanced and the actuation of the improved shutter is simplified.

Fig. 1 is a front elevational view of a shutter structure made in accordance with this invention, parts being broken away.

Fig. 2 is an enlarged vertical section taken on line 2—2 of Fig. 1.

Fig. 7 is an enlarged horizontal section taken on line 7—7 of Fig. 3.

Fig. 8 is an enlarged horizontal section taken on line 8—8 of Fig. 3.

Fig. 9 is an enlarged horizontal section taken on line 9—9 of Fig. 3.

Fig. 10 is an enlarged, fragmentary, cross-section taken on line 10—10 of Fig. 5.

Fig. 11 is an enlarged, fragmentary section taken on line 11—11 of Fig. 1.

Fig. 12 is a fragmentary, elevational view showing certain mechanism of the shutter structure in moved positions.

Figure 3:
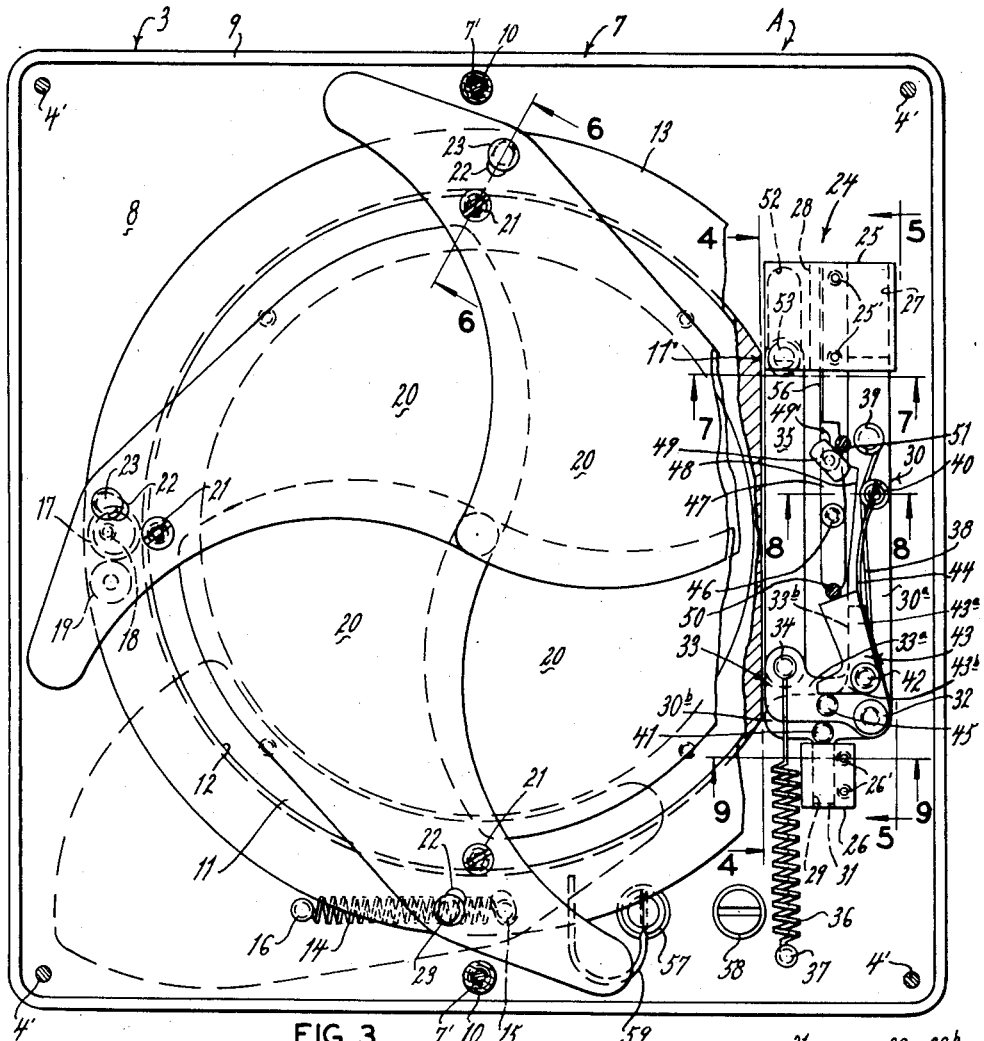
Fig. 3 is an enlarged vertical section taken through the housing of the shutter structure with parts of the mechanism within said housing shown in elevation and with other parts of said mechanism shown in section.

In the drawings, wherein is shown for purposes of illustration, merely, one embodiment of the invention, A designates the improved shutter structure generally. The shutter structure A includes a lens board 1 which supports, in the usual manner, a lens barrel 2 (Fig. 2) and fixed to the lens board 1 is a shutter housing 3. The particular shutter housing 3 illustrated in the drawings is made in two parts, there being a rear housing part 4 provided with a rear wall 5 and having a forwardly extending flanged portion 6, and a front housing part 7 provided with a front wall 8 and having a rearwardly extended flange 9. The housing part 4 is fixed to the lens board 1 by screws 4' which extend through apertures formed through the rear wall 5 thereof and are screwed into the lens board, while the part 7 of the housing 3 is secured to the housing part 4 by screws 7' which are extended through apertures formed through the front wall of said housing part 7 and are screwed into spacer elements 10 that extend forwardly from the rear wall 5 of the housing part 4. The flanges 6 and 9 of the housing parts 4 and 7 are disposed in abutting relation, as is shown in Fig. 2, whereby said abutting flanges serve as the top, bottom, and side walls of the housing 3. Also the rear wall of the housing part 4 and the front wall of the housing part 7 are provided with centrally located openings 4a and 7a which are alined with each other and with the bore of the lens barrel 2.

Interposed between the rear wall of the housing part 4 and the front wall of the housing part 7 is a stationary ring 11, said ring being pinned or otherwise secured to the front wall of the housing part 7. The stationary ring 11 is arranged with the face of bore thereof in alinement with the walls of the openings 4a and 7a of the housing parts 4 and 7, as is shown in Fig. 2, and at its rear portion said stationary ring is provided with an annular recess 12 that receives the inner portion of an annular ring-like element 13 which serves as a blade race and which is supported by the stationary ring 11 for rotary movement with respect thereto.

By referring to Fig. 3 it will be noted that a coil spring 14 is employed for rotating the blade race in a counterclockwise direction, this coil spring being connected at one of its ends to a pin 15 which is carried by the blade race and at its opposite end to a pin 16 fixed to and projected inwardly from the front wall 8 of the housing 3. Also, the front wall 8 of the housing 3 has mounted thereon at its inner face a stop element 17, said stop element being fixed to said front wall of the housing 3 by an eccentrically located screw 18, and said stop element is adapted to be contacted by a pin 19 carried by the blade race 13 so as to limit movement of said blade race in response to force exerted by the coil spring 14. Preferably the circumferential face of the stop element 17 is provided with a cover formed of rubber, or other suitable yieldable material so as to make contact between the pin 19 and the stop element substantially noiseless. Because of its eccentric mounting, the stop element 17 may be rotated to adjust the point of contact between the pin 19 and said stop element, the screw 18 being loosened to permit such adjustment of the stop element and said screw being re-set after the adjustment has been made to retain the stop element in its adjusted position.

Figures 4, 6:
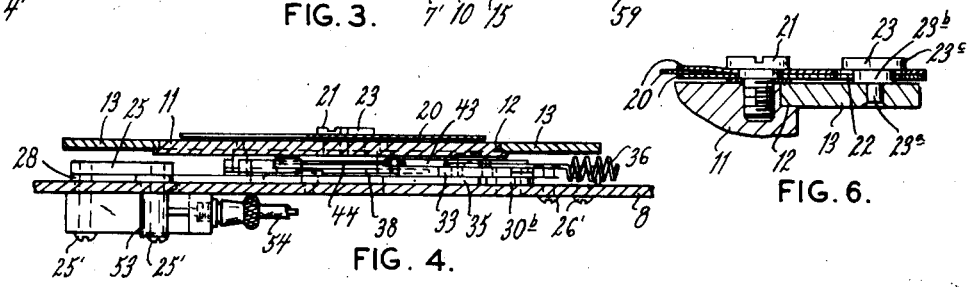
Fig. 4 is a section taken on line 4—4 of Fig. 3.
Fig. 6 is an enlarged section taken on line 6—6 of Fig. 3.
Figure 5:
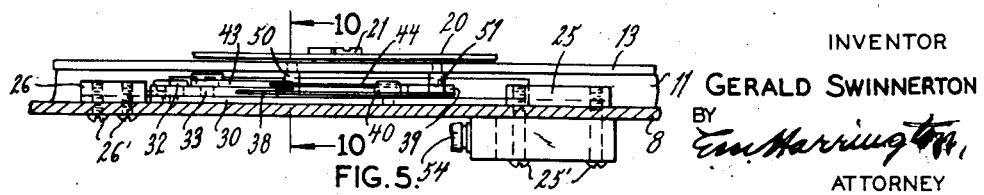
Fig. 5 is a section taken on line 5—5 of Fig. 3.

The shutter structure A includes a plurality of shutter blades, four of such blades being shown in the drawings and being designated therein by the reference character 20. The blades 20 are shaped as is shown to good advantage in Fig. 3, and each blade is pivoted to the stationary ring 11 by a pivot element in the form of a screw 21. Also, each blade 20 has a slot 22 formed therein through which is extended a pin 23 that is carried by the blade race 13. The pins 23 are shaped as shown in Fig. 6; that is to say, said pins 23 each include a pin portion 23a which is disposed in an aperture formed through the blade race 13, an intermediate portion 23b which is disposed in the slot of the related blade 20, and an enlarged head portion 23c. The outer end of the pin portion 23a of each pin 23 is riveted over so as to secure said pin to the blade race 13.

The stationary ring 11 is cut away at one side thereof, as is indicated at 11' in Fig. 3, to provide space for the actuating mechanism of the shutter structure, this actuating mechanism being designated generally in Fig. 3 by the reference character 24. The actuating mechanism 24 includes an upper bridge 25 and a lower bridge 26, said bridges 25 and 26 being fixedly secured respectively to the front wall 8 of the housing 3 by screws 25' and 26'. The upper bridge 25 is shaped to provide a vertical guideway 27 and a vertical guideway 28, the portion of the upper bridge 25 which is located between said guideways being provided with screwthreaded openings that receive the screwthreaded inner end portions of the screws 25'. Likewise, the lower bridge 26 is shaped to provide a vertical guideway 29 and the portion of said lower bridge at one side of the guideway 29 is provided with screwthreaded openings that receive the screwthreaded inner ends of the screws 26'. The actuating mechanism 24 includes also a main arm 30 which is of L-shaped formation, said main arm having a relatively long vertical portion 30a and a shorter, horizontal portion 30b, and the horizontal portion 30b of the main arm 30 is provided with a downwardly extended stem portion 31. The upper part of the vertical portion 30a of the main arm 30 is disposed for sliding, vertical movement in the guideway 27 of the upper bridge 25, and the stem 31 of the horizontal portion of said main arm is disposed for vertical sliding movement in the guideway 29 of the lower bridge 26.

Pivoted to the main arm 30 by a pivot element 32 is an L-shaped toggle member 33 which is provided with a horizontal portion 33a and a vertical portion 33b. The horizontal portion 33a of the toggle member 33 has pivotally attached thereto by a pivot element 34 a pull arm 35 whose upper part is disposed for vertical sliding movement in the guideway 28 of the upper bridge 25. Also, the pivot element 34 has attached thereto the upper portion of a coil spring 36, the lower portion of said coil spring being attached to a pin 37 which is mounted on the front wall 8 of the housing 3. Additionally, the toggle member 33 has associated therewith a leaf spring 38 which is supported by a pin 39 that is mounted on the vertical portion 30a of the main arm 30 and bears against a pin 40 which is also mounted on said vertical portion of said main arm. The lower, free end of the leaf spring 38 contacts with the portion 33b of the toggle member 33 and tends to resist movement of the portion 33b of said toggle member to the right in Fig. 3. It is to be noted from Fig. 3 that the main arm 30 supports a pin 41 which serves as a stop that limits pivotal movement of the toggle member 33 in one direction in response to force exerted by the coil spring 36 and the leaf spring 38. The pin 41 also limits downward movement of the main arm 30 with respect to the lower bridge 26 by contacting with the top of said lower bridge.

Pivoted to the toggle member 33 by a pivot element 42 is a toggle element 43, said toggle element being of substantial L-shaped formation, as is shown in Fig. 3, having an upwardly extended, inclined portion 43a, and a laterally extended portion 43b. The toggle element 43 has associated therewtih a leaf spring 44 which is supported by the pin 40 and contacts at its lower free end with the upstanding portion 43a of the toggle element 43 and tends to maintain the lateral portion 43b of the toggle element 43 in contact with a pin 45 which is supported by the toggle member 33.

Pivoted by a pivot element 46 to the front wall 8 of the housing 3 is a pawl 47, said pawl being normally disposed in an approximately vertical position, as is shown in Fig. 3. The upper portion of the pawl 47 is adapted to enter a notch 48 formed in the vertical portion 30a of the main arm 30, for a purpose to be hereinafter explained, and said pawl has mounted thereon an element 49 which is provided with an inclined top face 49'. The blade race 13 has fixed thereto a pin 50 and a pin 51 which serve functions to be hereinafter explained. Also, the front wall 8 of the housing 3 is provided with a slot 52 through which is extended an element 53 which is fixed to the upper portion of the pull arm 35. This element 53 is of semi-circular cross-sectional shape (Fig. 1) with a flat face thereof facing downwardly. The flat face of the element 53 is engaged by the operating element of a cable release mechanism 54, said element 53 being elevated when the button 55 of said cable release mechanism is depressed in the usual manner.

Under normal operating conditions of the shutter structure of this invention the pin 50 overlies and contacts with the top edge of the portion 43a of the toggle element 43 and the pin 51 is in the position in which it is shown in Fig. 3, where it contacts with the inclined face 49' of the element 49. Thus, in such positions of the parts of the shutter structure, the pin 51 holds the pawl in the position in which it is shown in Fig. 3 against the force exerted by a leaf spring 56 which is associated with said pawl and which tends to move the upper portion of the pawl to the right in Fig. 3. When the button 55 of the cable release 54 is pressed the pull arm 35 is elevated, the main arm 30, the toggle member 33 and the toggle element 43 moving upwardly with said pull arm 35. Such upward movement of the toggle element 43 causes the blade race to be rotated, because of contact with the top edge of said toggle element 43 of the pin 50 which is carried by the blade race, and as a result of such rotation of the blade race the pin 51, which is also carried by the blade race, moves away from the face 49' of the element 49 carried by the pawl 47.

When the pin 39 on the vertical portion of the main arm 30 reaches and contacts with the lower face of the upper bridge 25, bodily upward movement of said main arm and of the toggle member 30 and the toggle element 43 is arrested, and the upper portion of the pawl 47, which is now released from restraint imposed by the pin 51, moves into the notch 48 of the vertical portion of the main arm 30 whereby the main arm and the parts associated are located in the elevated positions to which they have been moved. Continued pressure against the button of the cable release mechanism will cause the pull arm to be subjected to additional upward movement and because the main arm is locked against any additional upward movement, by contact of the pin 39 with the lower face of the upper bridge 25, the toggle member 33 will be subjected to pivotal movement about its pivot 32. Such pivotal movement of the toggle member 33 imparts pivotal movement, through the pin 45, to the toggle element 43, said toggle element 43 being thereby withdrawn from beneath the pin 50 by the pivotal movement to which it is subjected whereby the coil spring 14 is permitted to return the blade race to a position where the pin 19 contacts with the stop element 17. When the blade race 13 is moved by the coil spring 14 to its position of rest, as described above, the pin 51 moves with said blade race and engages the inclined face 49' of the element 49 on the pawl 47 and cams the upper portion of said pawl out of the notch 48 of the vertical portion of the main arm 30. This permits the coil spring 36 to move the main arm and the parts associated therewith to their normal lowered positions, as is shown in Fig. 3.

When the main arm 30 is arrested in its upward movement by the pin 39 contacting with the lower portion of the upper bridge 25 and the pawl 47 locks said main arm in that elevated position, as described above, the blades 20 are in their fully open positions. Hence, when the camera is being focused or when time exposures are being made the blades are locked in their open positions by the pawl 47, the photographer ceasing depression of the button of the cable release mechanism when that point of the blade-actuating operation is reached. However, when an instantaneous exposure is desired the photographer presses the button of the cable release through this intermediate point and instantaneous opening and closing of the blades is obtained. It is to be noted that the pin 50 on the blade race 13 is in a lowered position when the main arm 30, the toggle member 33, and the toggle element 43 start to move downwardly upon disengagement of the upper portion of the pawl 47 from the notch 48 of the main arm, because of previous movement of the blade race 13 by the coil spring 14. However, such lowered position of the pin 51 does not interfere with downward movement of the toggle element 43 with the main arm 30 because the upwardly inclined portion 43a of said toggle element is cammed pivotally to the right in Fig. 3 by said pin 50 during such downward movement of said toggle element 43, the leaf spring 44 moving the toggle element 43 to the position in which it is shown in Fig. 3 when the main arm 30 has reached its lowered position where the pin 50 again overlies and contacts with the top edge of the portion 43a of said toggle element 43.

If desired the front wall 8 of the housing 3 may support a pair of spaced binding posts 57 and 58, the binding post 57 being insulated from the housing 3 while the binding post 58 is grounded to said housing 3. The binding post 57 is provided with a spring contact 59, formed of electrical conductive material, which is contacted by the pin 15, to which the coil spring 14 is attached, when the blades 20 have been moved to their open positions so as to set off a flash bulb, or other light-producing means, which is electrically connected to said binding posts 57 and 58.

I claim:

1. A photographic shutter structure comprising a plurality of movable shutter blades, a rotary blade race to which said blades are connected for actuation of said blades to open and closed positions on movement of said blade race, a projection extended from said blade race, means for subjecting said blade race to blade-opening movement comprising a main arm supported for guided movement, a toggle element movable bodily with said main arm and pivotally movable with respect thereto, said toggle element being adapted to engage said projection on said blade race so as to subject said blade race to rotary movement on movement of said main arm, and a pull arm adapted for movement which initially subjects said main arm and said toggle element to bodily movement and thereafter subjects said toggle element to pivotal movement which releases said projection of said blade race from said toggle element, and means comprising a spring for subjecting said blade race to blade-closing movement on release of said blade race projection from said toggle element.

2. A photographic shutter structure comprising a plurality of movable shutter blades, a rotary blade race to which said blades are connected for actuation of said blades to open and closed positions on movement of said blade race, a projection extended from said blade race, means for subjecting said blade race to blade-opening movement comprising a main arm supported for guided movement, a toggle element movable bodily with said main arm and pivotally movable with respect thereto, said toggle element being adapted to engage said projection on said blade race so as to subject said blade race to rotary movement on movement of said main arm, and a pull arm adapted for movement which initially subjects said main arm and said toggle element to bodily movement and thereafter subjects said toggle element to pivotal movement which releases said projection of said blade race from said toggle element, means comprising a spring for subjecting said blade race to blade-closing movement on release of said blade race projection from said toggle element, and means for arresting bodily movement of said main arm and said toggle element so as to cause said toggle element to be subjected to pivotal movement by said pull arm.

3. A photographic shutter structure comprising a plurality of movable shutter blades, a rotary blade race to which said blades are connected for actuation of said blades to open and closed positions on movement of said blade race, a projection extended from said blade race, means for subjecting said blade race to blade-opening movement comprising a main arm supported for guided movement, a toggle element movable bodily with said main arm and pivotally movable with respect thereto, said toggle element being adapted to engage said projection on said blade race so as to subject said blade race to rotary movement on movement of said main arm, and a pull arm adapted for movement which initially subjects said main arm and said toggle element to bodily movement and thereafter subjects said toggle element to pivotal movement which releases said projection of said blade race from said toggle element, means comprising a spring for subjecting said blade race to blade-closing movement on release of said blade race projection from said toggle element, and means for arresting bodily movement of said main arm and said toggle element so as to cause said toggle element to be subjected to pivotal movement by said pull arm, the last-mentioned means comprising an element carried by said main arm which is adapted to abut against a stationary part of the shutter structure.

4. A photographic shutter structure comprising a plurality of movable shutter blades, a rotary blade race to which said blades are connected for actuation of said blades to open and closed positions on movement of said blade race, a projection extended from said blade race, means for subjecting said blade race to blade-opening movement comprising a main arm supported for guided movement, a toggle element movable bodily with said main arm and pivotally movable with respect thereto, said toggle element being adapted to engage said projection on said blade race so as to subject said blade race to rotary movement on movement of said main arm, and a pull arm adapted for movent which initially subjects said main arm and said toggle element to bodily movement and thereafter subjects said toggle element to pivotal movement which releases said projection of said blade race from said toggle element, means comprising a spring for subjecting said blade race to blade-closing movement on release of said blade race projection from said toggle element, means for arresting bodily movement of said main arm and said toggle element so as to cause said toggle element to be subjected to pivotal movement by said pull arm, the last-mentioned means comprising an element carried by said main arm which is adapted to abut against a stationary part of the shutter structure, and a latching mechanism adapted for latching said blade race in the open positions of said blades.

5. A photographic shutter structure comprising a plurality of movable shutter blades, a rotary blade race to which said blades are connected for actuation of said blades to open and closed positions on movement of said blade race, a projection extended from said blade race, means for subjecting said blade race to blade-opening movement comprising a main arm supported for guided movement, a toggle element movable bodily with said main arm and pivotally movable with respect thereto, said toggle element being adapted to engage said projection on said blade race so as to subject said blade race to rotary movement on movement of said main arm, and a pull arm adapted for movement which initially subjects said main arm and said toggle element to bodily movement and thereafter subjects said toggle element to pivotal movement which releases said projection of said blade race from said toggle element, means comprising a spring for subjecting said blade race to blade-closing movement on release of said blade race projection from said toggle element, means for arresting bodily movement of said main arm and said toggle element so as to cause said toggle element to be subjected to pivotal movement by said pull arm, the last-mentioned means comprising an element carried by said main arm which is adapted to abut against a stationary part of the shutter structure, and a latching mechanism adapted for latching said blade race in the open positions of said blades, said latching mechanism comprising a latch member adapted to latchingly engage said main arm.

6. A photographic shutter structure comprising a plurality of movable shutter blades, a rotary blade race to which said blades are connected for actuation of said blades to open and closed positions on movement of said blade race, a projection extended from said blade race, means for subjecting said blade race to blade-opening movement comprising a main arm supported for guided movement, a toggle element movable bodily with said main arm and pivotally movable with respect thereto, said toggle element being adapted to engage said projection on said blade race so as to subject said blade race to rotary movement on movement of said main arm, and a pull arm adapted for movement which initially subjects said main arm and said toggle element to bodily movement and thereafter subjects said toggle element to pivotal movement which releases said projection of said blade race from said toggle element, means comprising a spring for subjecting said blade race to blade-closing movement on release of said blade race projection from said toggle element, means for arresting bodily movement of said main arm and said toggle element so as to cause said toggle element to be subjected to pivotal movement by said pull arm, the last-mentioned means comprising an element carried by said main arm which is adapted to abut against a stationary part of the shutter structure, and a latching mechanism adapted for latching said blade race in the open positions of said blades, said latching mechanism comprising a latch member adapted to latchingly engage said main arm, and an element carried by said blade race and adapted to move said latch member to and hold said latch member in its unlatched position.

7. A photographic shutter structure comprising a plurality of movable shutter blades, a rotary blade race to which said blades are connected for actuation of said blades to open and closed positions on movement of said blade race, means for subjecting said blade race to blade-opening movement comprising a main arm supported for guided movement, a toggle member pivoted to said main arm, a toggle element pivoted to said toggle member, a projection carried by said main arm against which said toggle member abuts, a projection carried by said toggle member against which said toggle element abuts, a projection on said blade race which is adapted to be engaged by said toggle element so as to subject said blade race to rotary movement on bodily movement of said main arm, said toggle member, and said toggle element, and a pull arm adapted for movement which initially subjects said main arm, said toggle member, and said toggle element to bodily movement and thereafter subjects said toggle element to pivotal movement which releases said projection of said blade race from said toggle element.

8. A photographic shutter structure comprising a plurality of movable shutter blades, a rotary blade race to which said blades are connected for actuation of said blades to open and closed positions on movement of said blade race, means for subjecting said blade race to blade-opening movement comprising a main arm supported for guided movement, a toggle member pivoted to said main arm, a toggle element pivoted to said toggle member, a projection carried by said main arm against which said toggle member abuts, a projection carried by said toggle member against which said toggle element abuts, a projection on said blade race which is adapted to be engaged by said toggle element so as to subject said blade race to rotary movement on bodily movement of said main arm, said toggle member, and said toggle element, a pull arm adapted for movement which initially subjects said main arm, said toggle member, and said toggle element to bodily movement and thereafter subjects said toggle element to pivotal movement which releases said projection of said blade race from said toggle element, and a latching mechanism for latching said blade race in the open position of said blades.

9. A photographic shutter structure comprising a plurality of movable shutter blades, a rotary blade race to which said blades are connected for actuation of said blades to open and closed positions on movement of said blade race, means for subjecting said blade race to blade-opening movement comprising a main arm supported for guided movement, a toggle member pivoted to said main arm, a toggle element pivoted to said toggle member, a projection carried by said main arm against which said toggle member abuts, a projection carried by said toggle member against which said toggle element abuts, a projection on said blade race which is adapted to be engaged by said toggle element so as to subject said blade race to rotary movement on bodily movement of said main arm, said toggle member, and said toggle element, a pull arm adapted for movement which initially subjects said main arm, said toggle member, and said toggle element to bodily movement and thereafter subjects said toggle element to pivotal movement which releases said projection of said blade race from said toggle element, and a latching mechanism for latching said blade race in the open position of said blades, said latching mechanism comprising a latch member adapted to latchingly engage said main arm.

10. A photographic shutter structure comprising a plurality of movable shutter blades, a rotary blade race to which said blades are connected for actuation of said blades to open and closed positions on movement of said blade race, means for subjecting said blade race to blade-opening movement comprising a main arm supported for guided movement, a toggle member pivoted to said main arm, a toggle element pivoted to said toggle member, a projection carried by said main arm against which said toggle member abuts, a projection carried by said toggle member against which said toggle element abuts, a projection on said blade race which is adapted to be engaged by said toggle element so as to subject said blade race to rotary movement on bodily movement of said main arm, said toggle member, and said toggle element, a pull arm adapted for movement which initially subjects said main arm, said toggle member, and said toggle element to bodily movement and thereafter subjects said toggle element to pivotal movement which releases said projection of said blade race from said toggle element, and a latching mechanism for latching said blade race in the open position of said blades, said latching mechanism comprising a latch member adapted to latchingly engage said main arm, and an element carried by said blade race and adapted to move said latch member to and hold said latch member in its unlatched position.

GERALD SWINNERTON.

REFERENCES CITED

The following references are of record in the file of this patent:

UNITED STATES PATENTS

| Number | Name | Date |
| --- | --- | --- |
| 1,941,292 | Deckel et al. | Dec. 26, 1933 |
| 2,176,621 | Brueck | Oct. 17, 1939 |
| 2,326,077 | Steiner | Aug. 3, 1943 |
| 2,331,569 | Pirwitz | Oct. 12, 1943 |
| 2,365,847 | Steiner | Dec. 26, 1944 |
| 2,404,526 | Pirwitz | July 23, 1946 |
| 2,422,018 | Hutchison | Jan. 10, 1947 |
| 2,490,755 | Hutchison | Dec. 6, 1949 |